Figure 1:
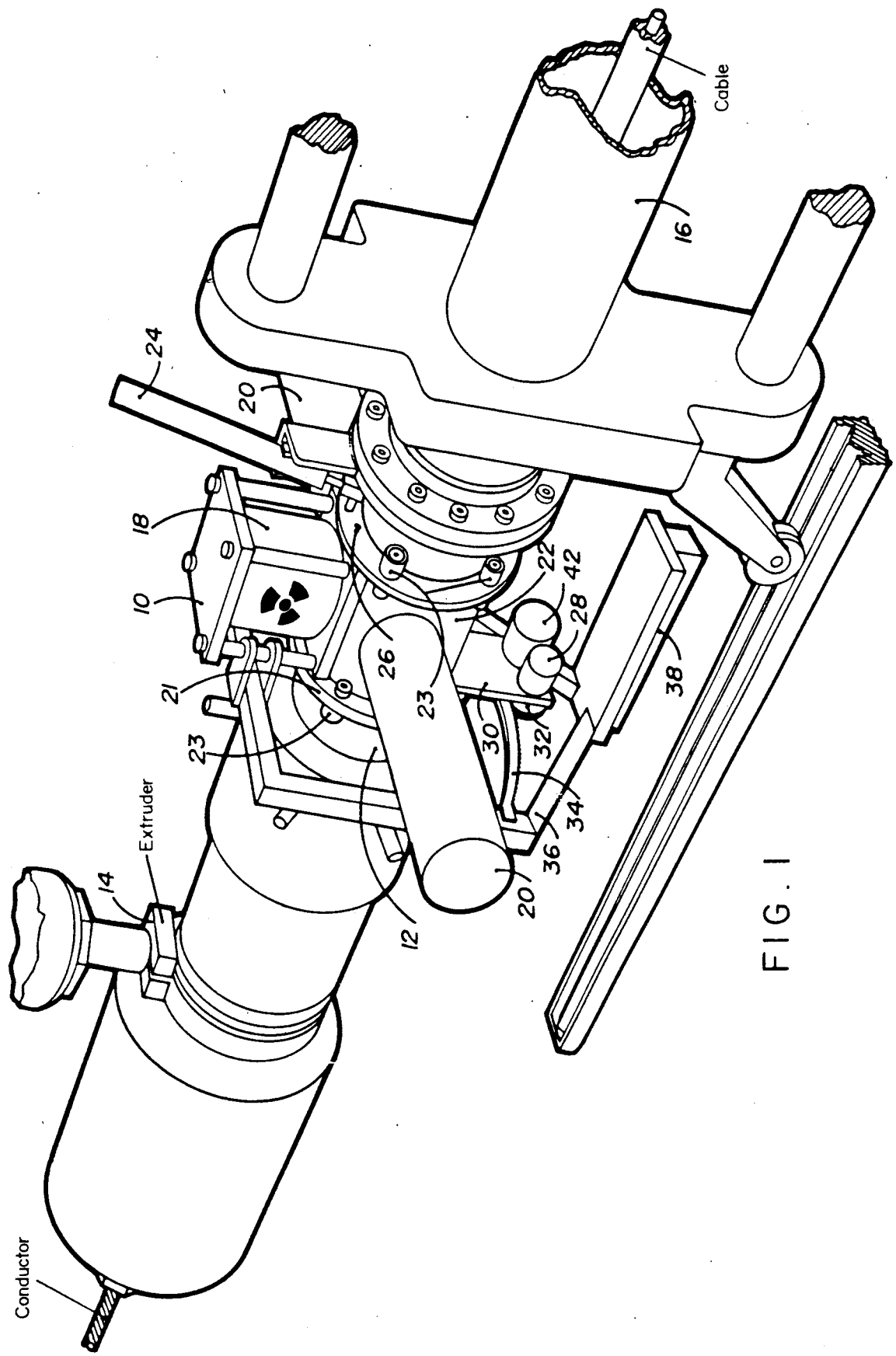

United States Patent [19]

Lucas et al.

[11] Patent Number: 5,054,043
[45] Date of Patent: Oct. 1, 1991

[54] CABLE INSULATION ECCENTRICITY AND DIAMETER MONITOR

[75] Inventors: John M. Lucas, Montréal; Frank W. Hintze, Thornhill, both of Canada

[73] Assignee: Canada Wire and Cable Limited, Don Mills, Canada

[21] Appl. No.: 614,976

[22] Filed: Nov. 19, 1990

Related U.S. Application Data

[63] Continuation of Ser. No. 358,428, May 30, 1989, abandoned.

[30] Foreign Application Priority Data

Sep. 9, 1988 [CA] Canada .................................. 576977

[51] Int. Cl.$^5$ ............................................. G01B 15/02
[52] U.S. Cl. ....................................... 378/89; 378/86
[58] Field of Search ..................................... 378/86, 89

[56] References Cited

U.S. PATENT DOCUMENTS 3,148,279 9/1964 Skala ..................................... 378/86

Primary Examiner—Craig E. Church
Attorney, Agent, or Firm—Fleit, Jacobson, Cohn, Price, Holman & Stern

[57] ABSTRACT

A cable insulation eccentricity and diameter monitor comprises a revolving structure mounted coaxially with the cable, a finely collimated source of gamma particles mounted on such revolving structure for generating a beam of gamma particles, a radiation detector fixed to the revolving structure for detecting the gamma particles scattered from such beam by the cable and for generating pulses the amplitude of which is dependent on the energy of the scattered gamma particles reaching the detector, first drive means for moving the source of gamma particles so as to direct the beam at predetermined target positions corresponding to probable conductor and cable/atmosphere boundaries of the cable along a first axis perpendicular to the axis of the cable, second drive means for repositioning the revolving structure to move the source of gamma particles and the radiation detector to a position around the cable so as to direct the beam at target positions corresponding to probable conductor and cable/atmosphere boundaries along a second axis perpendicular to the axis of the cable, a pulse height analyzer responsive to the detector for detecting and counting the pulses produced by the detector within a preset range of pulse height, and a computer responsive to the output of the pulse height analyzer and to test data stored in its memory for operating the first and second drive means to find the actual location of such boundaries and for computing insulation eccentricity and diameter of the cable from such findings.

7 Claims, 4 Drawing Sheets

CABLE INSULATION ECCENTRICITY AND DIAMETER MONITOR

This application is a continuation of application Ser. No. 358,428, filed May 30, 1989, now abandoned.

This invention relates to the measurement of cable eccentricity and diameter, and more particularly to on-line solid dielectric high voltage cable eccentricity and diameter measurement.

Control of insulation eccentricity and diameter are essential to high voltage cable manufacture. For catenary vulcanization lines normally used in industry, a long cable run (sometimes exceeding 150 meters) exists between the extrusion head and the first point at which the cable is accessible to presently available monitors. Therefore, considerable losses of cable occur because of the control lag (which can range from 30 to 60 min. for the largest cables) associated with this length. This particularly affects larger high voltage cables.

It is therefore the object of the present invention to provide an apparatus for on-line measurement of cable eccentricity and diameter which may be located close to the extrusion head to reduce cable and material losses.

The monitor in accordance with the present invention comprises a revolving structure mounted coaxially with the cable, a finely collimated source of gamma particles mounted on such revolving structure for generating a beam of gamma particles, a radiation detector fixed to the revolving structure for detecting the gamma particles scattered from such beam by the cable and for generating pulses the height of which is dependent on the energy of the scattered gamma particles reaching the detector, first drive means for moving the source of gamma particles so as to direct the beam at predetermined target positions corresponding to probable conductor and cable/atmosphere boundaries of the cable along a first axis perpendicular to the axis of the cable, second drive means for repositioning the revolving structure to move the source of gamma particles and the detector to a position around the cable so as to direct the beam at target positions corresponding to conductor and cable/atmosphere boundaries along a second axis perpendicular to the axis of the cable, a pulse height analyser responsive to the detector for detecting and counting the pulses produced by the detector within a preset range of pulse height, and a computer responsive to such pulse height analyser and to test data stored in its memory for operating the first and second drive means to find the actual location of such boundaries and for computing cable insulation eccentricity an diameter from such findings.

There is preferably a detector on each side of the cable so as to be able to find the boundaries on each side of the cable without having to move the detector around the cable to complete the measurements along one axis.

A variable high voltage source is preferably provided for varying the gain of the detectors for calibration which is generally done by generating reference particles of reproducible energy distribution and by setting the gain of the detector to produce resulting pulses of reproducible height distribution.

The detectors are also preferably provided with temperature sensors for calibration control.

Figure 2:
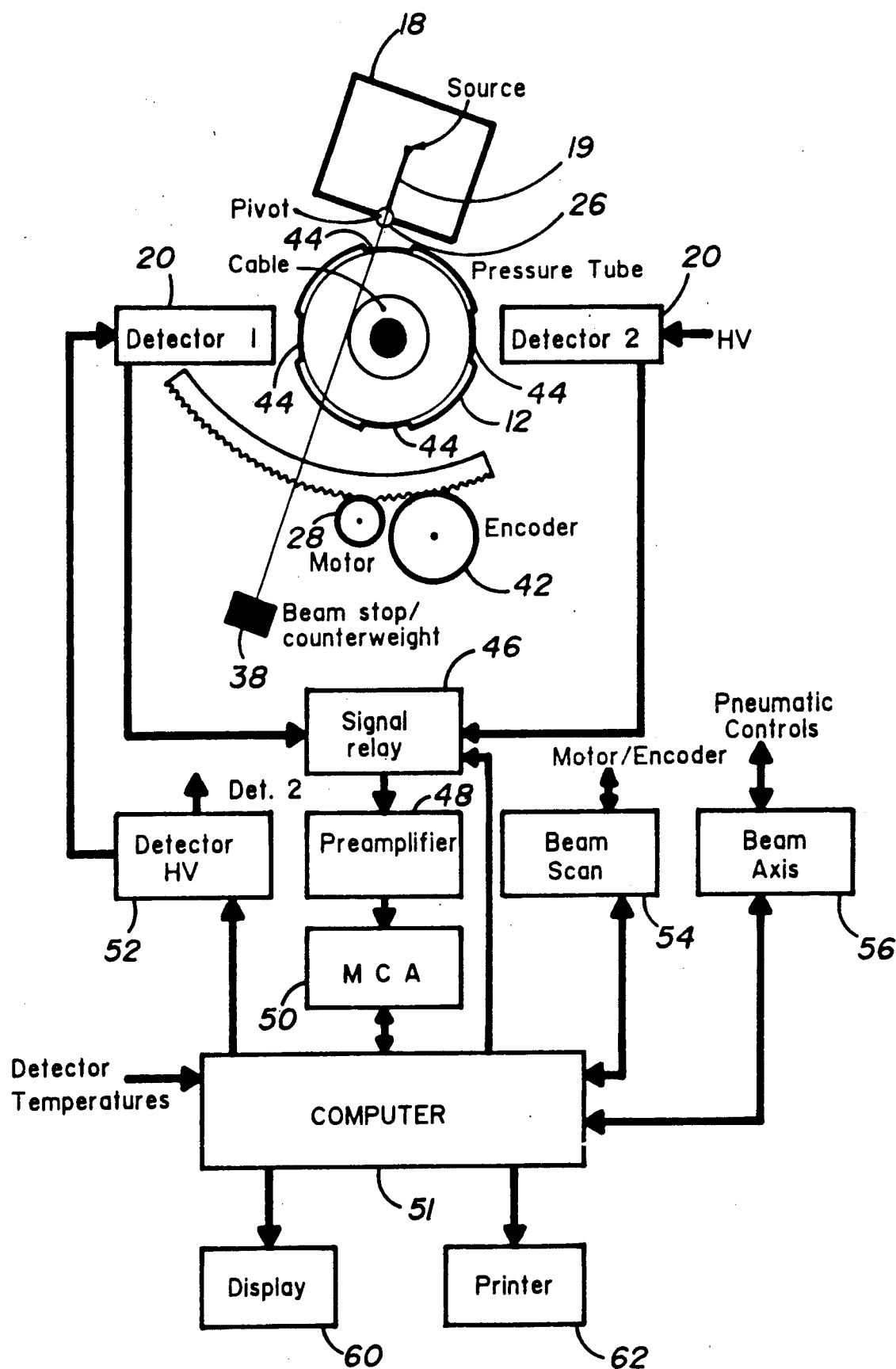
Figure 3:
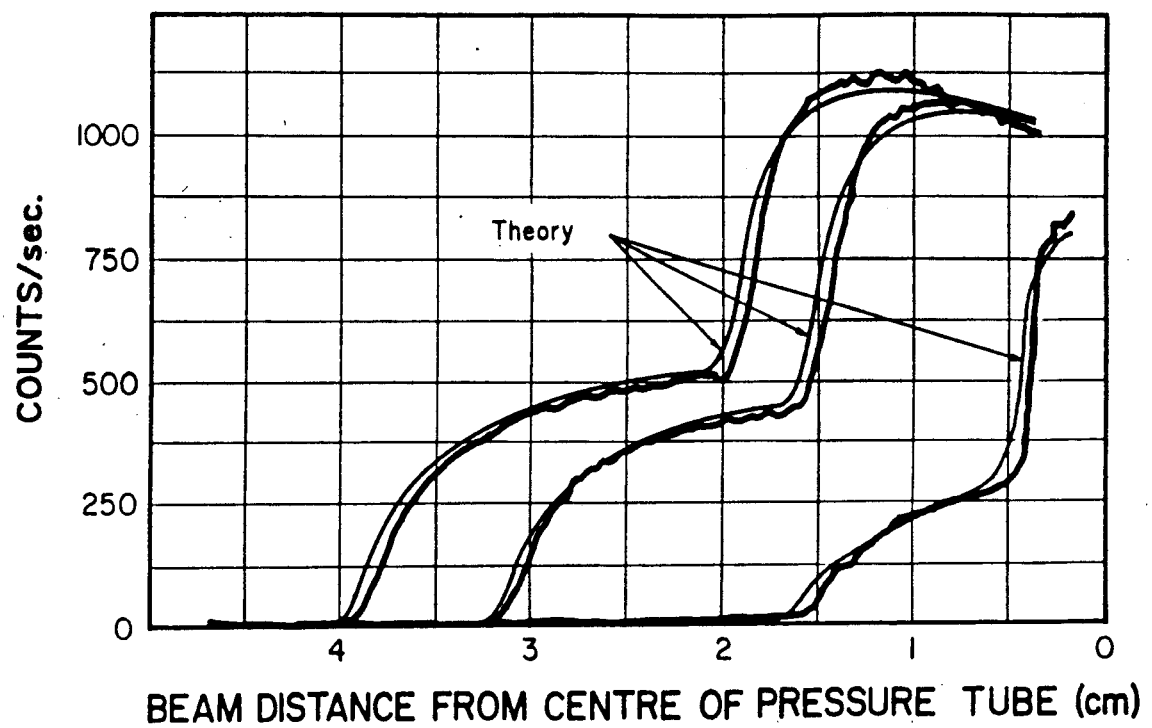
Figure 4:
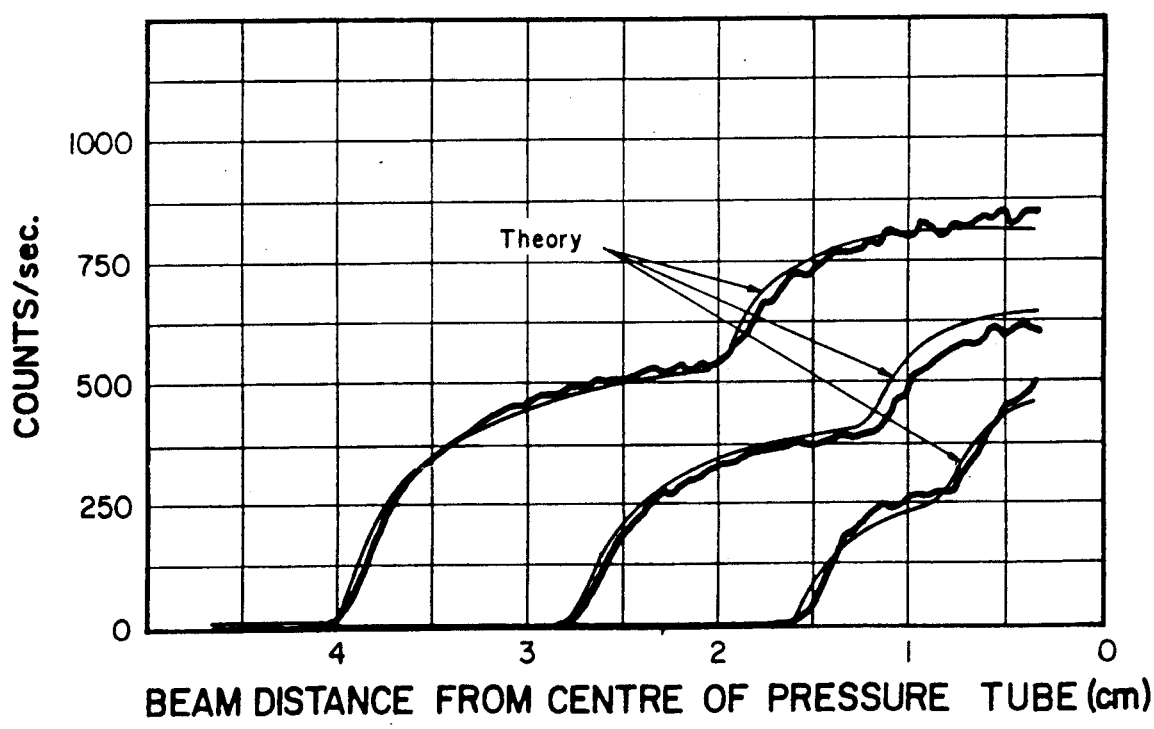
Figure 5:
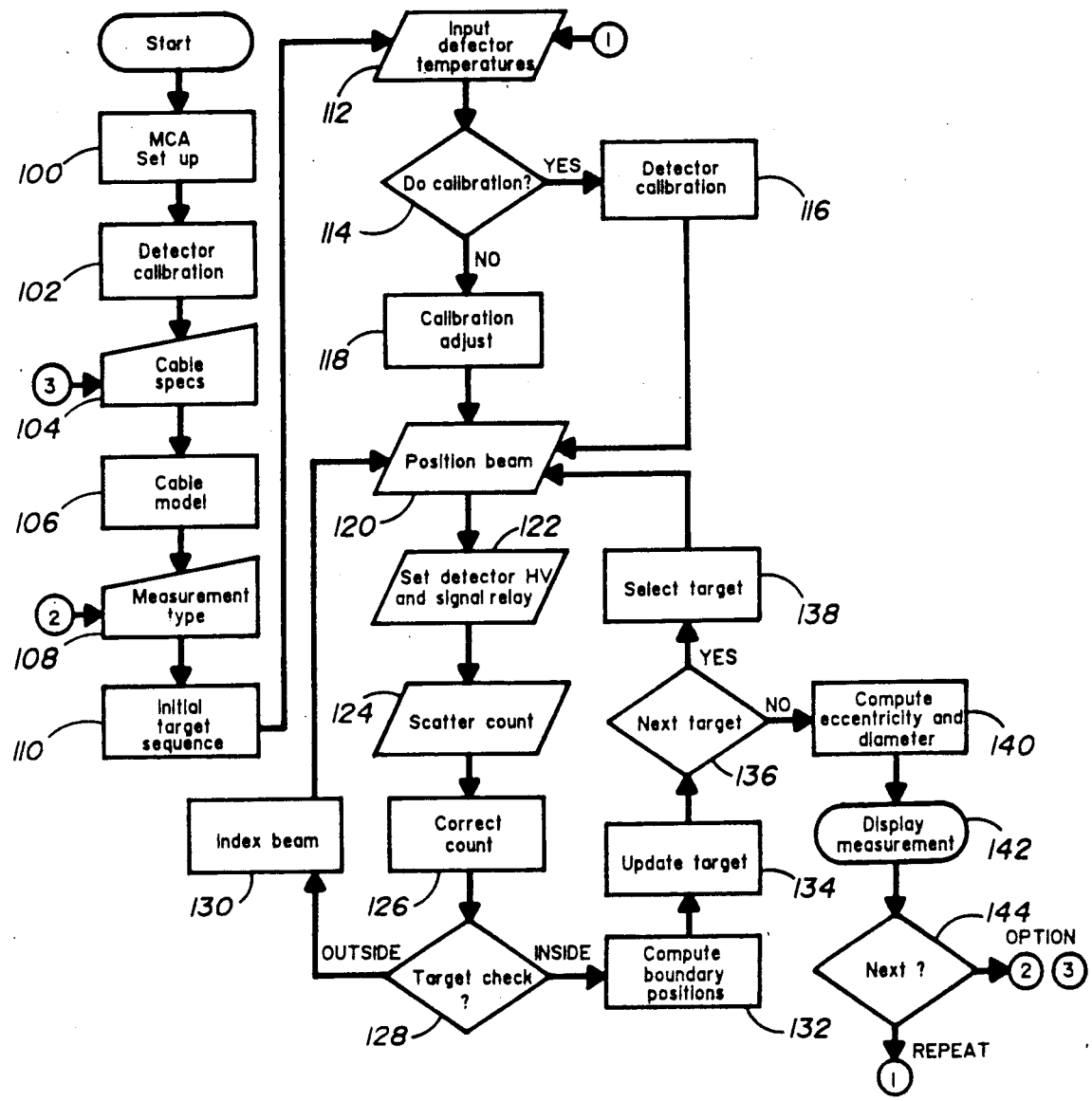

The invention will now be disclosed by way of example with reference to a preferred embodiment illustrated in the accompanying drawings in which:

FIG. 1 is a three-dimensional schematic view of a monitor in accordance with the present invention installed close to the extrusion head of a cable vulcanization line;

FIG. 2 gives an overall view of the monitoring system with a computer at its core;

FIGS. 3 and 4 show experimental data fitted to theoretical scattering curves for three copper and aluminum cable sizes; and FIG. 5 is a simplified program flowchart of the monitoring system in accordance with the present invention.

Referring to FIG. 1 of the drawings, there is shown a cable eccentricity and diameter monitor designated generally by reference numeral 10 mounted on an extension 12 between an extruder 14 and a pressurized catenary vulcanization line 16. Basically, the monitor comprises a source of gamma particles enclosed in a source holder 18 and two radiation detectors 20 which are mounted on a revolving structure consisting of two end rings 21 joined by lateral blocks 22. The revolving structure is rotated on suitable bearings 23 around the extension 12 by a pneumatic cylinder 24. The radiation detectors are fixed at 180° apart on the blocks 22 of the revolving structure whereas the source holder 18 is pivotally mounted on the rings 21 of the revolving structure around pivot points 26. The source holder 18 may be pivoted around the pivot points 26 by means of a reversible motor 28 which is mounted on a plate 30 secured to the revolving structure. The shaft of the motor is provided with a gear wheel 32 which engages a section gear 34 secured to a frame 36 attached to the source holder. The source holder is fabricated of dense shielding material, such as lead, to eliminate radiation hazards to operating personnel. In view of the weight of the source holder, a counterweight 38 is provided at the opposite end of frame 36. Such counterweight also acts as a beam stop to absorb radiation passing through the monitor. An encoder 40 is also provided for measuring the angular position of the beam.

Referring to FIG. 2, there is schematically shown a source of gamma particles such as cesium 137, enclosed in source holder 18 and generating a beam of gamma particles through a collimator 19 made of suitable material such as tungsten alloy. The collimator, and to some extent source geometries, define the shape and intensity of the gamma particle beam illuminating the cable. These, in turn, influence measurement resolution. The beam cross section employed in the monitor here is about 0.1 cm perpendicular to the axis of the cable $\times$ 8.0 cm parallel to the axis of the cable. Analyses and tests with more finely collimated beams (to about 0.05 cm wide) showed that the associated loss of intensity outweighed the benefits of finer collimation. Background counts due to the proximity of the source to the detector can outnumber those obtained from the cable. Furthermore, the efficiency of source utilization suffers as its radiation is increasingly occluded by narrower collimation. As mentioned previously the source is pivoted around pivot points 26 to direct a radiation beam at or near the conductor and cable/atmosphere boundaries of the cable moving through the extension 12 of the pressurized vulcanization line.

The extension 12 is preferably provided with windows 44 of reduced thickness to lower absorption and scatter of the gamma particles. The gamma particles scattered at or near the boundaries and entering a suitable detector 20, such as a sodium iodide scintillation detector, on one side or the other of the cable depending on the side of the cable being scanned, cause such detector to generate pulses the magnitude of which depends on the energy of the gamma particles entering the detector.

It is noted that the energy of the scattered gamma particles is a function of their angular deviation. Thus particles scattered from the cable into the detector possess, by virtue of the monitor geometry, a specific energy range which, for a cesium 137 source emitting gamma particles of 0.662 MeV, is from about 0.24 to 0.40 MeV. Since the deviations of particles scattered into the detector from the collimator window and beam stop are respectively, less and greater than those from the cable, their characteristic energies tend to bracket the above range for the cable. Thus the setting of upper and lower energy limits has a considerable effect in discriminating between wanted and unwanted scattered particles. The count pulses from one detector or the other are therefore switched, through a signal relay 46 and a preamplifier 48, into a multichannel pulse height analyser 50 which will limit the range of interest. This reduces the inclusion of background counts detected by the detectors. A single channel pulse height analyser may be used for measurement. However a multichannel pulse height analyser is preferably used because the flexibility of its features simplifies pulse height analysis for calibration of the detectors by the computer.

The detectors are calibrated by generating particles of reproducible energy distribution and by setting the gain of the detector using a high voltage source 52 so as to produce resulting pulses of reproducible height distribution. This may done by scattering of the beam of gamma particles from a monitor target position which produces a peak in the pulse height distribution, by means of an external source or by means of an internal detector reference such as an americium 241 pulser.

The monitor is under the control of a computer 51 which operate signal relay 46, the multichannel pulse height analyzer 50, HV source 52, and the scan and axis drives 28 and 24 through beam scan and beam axis interfaces 54 and 56. The results computed by the computer are displayed on a suitable display device 60 and, if required, on a printer 62.

A mathematical model for the scattering of a gamma particle beam from a cable has been created and its behaviour computed for a number of cable structures. The model takes into account the beam width, and its absorption before and after scattering from concentric cylinders of different density. FIGS. 3 and 4 show that a good fit is obtained between such a mathematical model and experimental data obtained using three different cable sizes ranging from large to small (7.6, 6.0, 3.0 cm OD) with both copper and aluminum conductors, respectively. Note that in fitting the data, background has been substracted and the dependence of detector collection efficiency with distance from the beam corrected. Note also that the counts indicated are arbitrary scaled and do not correspond to actual measured counts. For a 7.5 cm OD high density polyethylene cable with a 3.5 cm copper conductor counts typically vary between 400 counts/sec in the insulation to 800 counts/sec when the beam is in the conductor, for a 1850 Megabecquerel source.

The operation of the monitoring system in accordance with the present invention will now be disclosed with reference to the simplified program flowchart shown in FIG. 5.

Multichannel Pulse Height Analyser Set

The program segment 100 assigns function and parameter variables to operate the multichannel pulse height analyzer. Gain, group selection and other operating conditions are selected. Regions of interest (ROI) corresponding to pulse energy ranges for (a) detector calibration, and (b) cable measurement are also set up.

Detector Calibration

The following fully automated sequence summarizes calibration of the detectors 20 by segment 102 of the computer program:

a) Beam is scanned to a pre-set target which maximizes a scattering peak (count versus pulse height) off the monitor structure.

b) Detector calibration ROI is selected. This ROI consists of two adjacent pulse height bands centered on the required scattering peak position. The peak is positioned by comparing the total counts within each band.

c) A short scattering count is performed to test the actual position of the scattering peak.

d) Feedback to the detector high voltage power supply control voltage is employed to adjust the detector gain to seek the required scattering peak position.

e) Steps (c) and (d) are repeated until peak positioning criteria are met. For greater precision, the count time is increased as the peak target is approached.

f) The HV control voltage at successful calibration is saved in memory.

Cable Specifications

Conductor and insulation diameters and densities are entered into segment 104 of the computer program by a series of prompts, or automatically downloaded from a supervisory system.

Cable Model

Gamma particle scattering at the conductor and cable/atmosphere boundary regions is computed in segment 106 of the computer program and stored as the model solution array for the cable specified in segment 4.

Measurement Type

Eccentricity and diameter, or diameter only, menu options are presented by segment 108 of the computer program and selected by the operator. Measurement axis (horizontal, vertical or both) is also selected by the operator.

Initialize Target Sequence

Based on cable specification and measurement type, an initial array of beam scan positions or targets is set up by segment 110 of the computer program.

Input Detector Temperatures

Temperature sensors inside the detector housings are read by segment 112 of the computer program.

Do Calibration ?

Detector calibration is dependent on time elapsed or temperature change since last calibration, or rate of temperature change. Depending on such conditions segment 114 of the computer program decides to do full calibration as in segment 102 or not.

Calibration Adjust

If full calibration is not performed, the detector HV control voltage 52 is adjusted by segment 118 of the computer program to provide limited detector gain correction in proportion to any temperature change since the last calibration.

Position Beam

In segment 120 of the computer program, the beam is scanned to the first position of the initial target array determined in segment 110 above.

Set Detector HV and Signal

The control voltage and signal switching for the detector closest to the beam are activated by segment 122 of the computer program.

Scatter Count

The cable measurement ROI is selected by segment 124 of the computer program and counts acquired for a preset time.

Correct Count

The gross count within the cable measurement ROI is automatically corrected by segment 126 of the computer program for source decay, background and variation in detector particle collection efficiency with beam position (distance correction) from information stored in the memory of the computer.

Target Check

The correct count is tested by segment 128 of the computer program to establish whether it falls outside or inside the target range established by the model in segment 106.

Index Beam

If the count falls outside the target range established by the model, segment 130 of the computer program determines the direction and amount of scan position change to search for the boundary.

Compute Boundary Position

If the count falls inside the target range established by the model, the exact boundary position is computed from the model array, corrected counts and beam position by segment 132 of the computer program.

Update Target

The beam target for the completed boundary position is updated in segment 134 of the computer program to facilitate targeting on the next scan.

Next Target?

Segment 136 of the computer program establishes whether the beam must be positioned at another target to complete the current measurement cycle.

Select Target

If the measurement cycle is not complete, segment 138 of the computer program selects next target for beam position. For the first measurement cycle, the target is taken from the initialized target sequence array. Subsequent cycles employ updated targets.

Compute Eccentricity and Diameter

If the measurement cycle is completed, segment 140 of the computer program uses the array of measured boundary positions to compute the eccentricity and diameter measurements.

Display Measurement

Tabular or graphical display modes are available for presenting measurements on a video monitor at 142.

Next-Step

Options are available at 144 to:
1. repeat the measurement cycle, either automatically, or on demand,
2. change the measurement type, or
3. change the cable specification set up.

To summarize, the multichannel pulse height analyser and the scan and axis drives are all under computer control. Based on cable specifications or identifying code numbers entered into the computer, the appropriate drives will be activated to direct the scanning beam to the probable positions of the boundaries requiring measurement. Short count times will be used to test beam position, which will, if necessary, be automatically indexed to search out the exact boundary region. Thus provided, the beam is positioned to within about 0.5 mm or less of the boundary under measurement; counting at a single position will be sufficient for computation of the exact boundary coordinate. Boundaries can, in general, be accurately determine with 10 s. counting times. Thus, allowing for beam repositioning and boundary searches, a total of 2 minutes may be required to perform the eight boundary measurements needed for complete eccentricity and diameter characterization. For larger cables this is about ten to twenty times less than the time presently taken to pass through the vulcanization line and reach the end of the cooling section of the vulcanization line for monitoring with presently available instrumentation.

The measurement reproducibility principally depends on two factors:
beam position certainty;
random statistical errors.

Beam Position Error

The beam position error can be made small (less than 0.03 mm) using a precisely controlled motor in conjunction with a high resolution optical encoder.

Random Statistical Errors at Cable/Atmosphere Boundary

For a 10 s. count and a 1850 Megabecquel source the standard deviation to which the cable/atmosphere boundary is measured varies between 0.03 and 0.05 mm for large (4 to 8 cm) and small (2.5 to 4 cm) cables, respectively.

Random Statistical Errors at Conductor Boundary

For copper cables, determination of the conductor boundary is to a deviation of 0.03 mm for larger conductors (above 2 cm in OD) and about 0.05 mm for smaller cables. For aluminum conductors the errors double the same counting time. This is apparent from the lower slopes of the curves of FIG. 4.

Although the invention has been disclosed with reference to a preferred embodiment, it is to be understood that it is not limited to such embodiment and that other alternatives are also envisaged. For example, the source 18 could be mounted so that the beam traverses linearly between the cable/atmosphere and the conductor boundaries. The multichannel pulse height analyser could also be a single channel pulse height analyser. Various means of calibrating the detectors may also be used.

What is claimed is:

1. A cable insulation eccentricity and diameter monitor comprising:
    an elongated conductor,
    an extruder encasing said elongated conductor in electrical insulation to form a cable,
    a pressurized catenary vulcanization line,
    a revolving structure located between said extruder and said pressurized catenary vulcanization line and mounted coaxially with the cable;
    a finely collimated source of gamma particles mounted on said revolving structure for generating a beam of gamma particles;
    a radiation detector fixed to said revolving structure for detecting the gamma particles scattered from said beam by said conductor and by said insulation of said cable and for generating pulses the amplitude of which is dependent on the energy of the scattered gamma particles reaching the detector scattered from said conductor and scattered from said insulation;

first drive means for moving the source of gamma particles relative to said revolving structure so as to direct the beam at a first set of predetermined target positions corresponding to probable conductor and cable/atmosphere boundaries of the cable in a plane substantially normal to the axis of the cable;

second drive means for repositioning said revolving structure to move said source of gamma particles and said radiation detector to move said source of gamma particles and said radiation detector to a position around the cable which is at a predetermined angle with respect to their original position so as to direct the beam at a second set of target positions corresponding to probable conductor and cable/atmosphere boundaries;

a pulse height analyzer responsive to said detector for detecting and counting the pulses produced by the detector within a preset range of pulse height as a result of scattering of gamma particles from said conductor and scattering of gamma particles from said insulation; and a computer responsive to the output of said pulse height analyzer and to test data stored in its memory for operating said first and second drive means to find the actual location of said boundaries and for computing insulation eccentricity and diameter of the cable from said findings.

2. A cable insulation eccentricity and diameter monitor as defined in claim 1, further comprising a high voltage source for varying the gain of the detector for calibration.

3. A cable insulation eccentricity and diameter monitor as defined in claim 1, wherein said detector is a sodium iodide/scintillation detector.

4. A cable insulation eccentricity and diameter monitor as defined in claim 1, wherein a tungsten alloy collimator is used to collimate said source of gamma particles.

5. A cable insulation eccentricity and diameter monitor as defined in claim 1, wherein said source of gamma particles is a cesium 137 source.

6. A cable insulation eccentricity and diameter monitor as defined in claim 1, comprising a detector on each side of the cable so as to be able to find the boundaries without having to move the detector around the cable to complete the measurements along one axis.

7. A cable insulation eccentricity and diameter monitor as defined in claim 1 further comprising temperature detectors located inside the detector for detecting temperature changes during monitoring.

* * * * *